(12) United States Patent
Steffanson et al.

(10) Patent No.: US 10,422,698 B2
(45) Date of Patent: Sep. 24, 2019

(54) APPARATUS AND METHOD FOR ELECTROMAGNETIC RADIATION SENSING

(71) Applicant: MP High Tech Solutions Pty Ltd, Eveleigh, NSW (AU)

(72) Inventors: Marek Steffanson, Mosman (AU); Donald James Bone, Wentworth Falls (AU)

(73) Assignee: MP HIGH TECH SOLUTIONS PTY LTD., Eveleigh, NSW (AU)

( * ) Notice: Subject to any disclaimer, the term of this patent is extended or adjusted under 35 U.S.C. 154(b) by 0 days.

(21) Appl. No.: 15/828,212

(22) Filed: Nov. 30, 2017

(65) Prior Publication Data
US 2018/0100768 A1 Apr. 12, 2018

Related U.S. Application Data

(63) Continuation of application No. 14/750,403, filed on Jun. 25, 2015, now Pat. No. 9,851,256.
(Continued)

(51) Int. Cl.
*G01J 5/10* (2006.01)
*G01J 5/08* (2006.01)
(Continued)

(52) U.S. Cl.
CPC ............ *G01J 5/10* (2013.01); *G01J 5/0803* (2013.01); *G01J 5/0806* (2013.01);
(Continued)

(58) Field of Classification Search
CPC .......... G01J 5/10; G01J 5/0803; G01J 5/0931; G01J 5/40; G02B 25/085
See application file for complete search history.

(56) References Cited

U.S. PATENT DOCUMENTS 3,896,309 A    7/1975    Halsor et al.
5,929,440 A *   7/1999    Fisher ...................... G01J 5/40
                                                                                                                          250/332
(Continued)

FOREIGN PATENT DOCUMENTS

EP          1692550      2/2012
WO      1997026556    7/1997

OTHER PUBLICATIONS

European Patent Application No. 15811698.8, extended European Search Report, dated Feb. 13, 2018.
(Continued)

*Primary Examiner* — Yara B Green
(74) *Attorney, Agent, or Firm* — Greenberg Traurig, LLP

(57) ABSTRACT

Systems, methods, and apparatus for providing electromagnetic radiation sensing. The apparatus includes a radiation detection sensor including a plurality of micromechanical radiation sensing pixels having a reflecting top surface and configured to deflect light incident on the reflective surface as a function of an intensity of sensed radiation. In some implementations, the apparatus has equal sensitivities for at least some of the sensing pixels. In some implementations, the apparatus can provide adjustable sensitivity and measurement range. The apparatus can be utilized for human detection, fire detection, gas detection, temperature measurements, environmental monitoring, energy saving, behavior analysis, surveillance, information gathering and for human-machine interfaces.

20 Claims, 12 Drawing Sheets

Related U.S. Application Data

(60) Provisional application No. 62/017,724, filed on Jun. 26, 2014.

(51) Int. Cl.
  *G02B 26/08* (2006.01)
  *G01J 5/40* (2006.01)
  *G01J 5/00* (2006.01)

(52) U.S. Cl.
  CPC ............ *G01J 5/0831* (2013.01); *G01J 5/0896* (2013.01); *G01J 5/40* (2013.01); *G02B 26/085* (2013.01); *G01J 2005/0077* (2013.01)

(56) References Cited

U.S. PATENT DOCUMENTS

| | | | |
|---|---|---|---|
| 6,031,619 A * | 2/2000 | Wilkens | G01J 3/02 |
| | | | 250/226 |
| 6,208,413 B1 * | 3/2001 | Diehl | G01J 3/10 |
| | | | 356/310 |
| 6,242,738 B1 | 6/2001 | Ju | |
| 6,339,219 B1 | 1/2002 | Ishizuya et al. | |
| 6,444,972 B1 | 9/2002 | Datskos et al. | |
| 6,835,932 B2 | 12/2004 | Ishizuya et al. | |
| 7,064,883 B2 * | 6/2006 | Payne | G02B 26/001 |
| | | | 359/290 |
| 7,646,494 B2 | 1/2010 | Lechuga Gomez et al. | |
| 7,705,307 B1 | 4/2010 | Zhao et al. | |
| 7,705,309 B1 | 4/2010 | Jin et al. | |
| 7,825,381 B2 | 11/2010 | Erdtmann et al. | |
| 8,242,446 B2 | 8/2012 | Fleury-Frenette et al. | |
| 8,283,256 B1 | 10/2012 | Pan et al. | |
| 8,440,972 B2 | 5/2013 | Streuber et al. | |
| 8,624,187 B2 | 1/2014 | Urey et al. | |
| 9,810,581 B1 | 11/2017 | Steffanson | |
| 9,851,256 B2 * | 12/2017 | Steffanson | G01J 5/10 |
| 9,857,229 B1 | 1/2018 | Steffanson | |
| 10,107,691 B2 | 10/2018 | Steffanson | |
| 2002/0036265 A1 | 3/2002 | Ishizuya et al. | |
| 2004/0147056 A1 | 7/2004 | McKinnell et al. | |
| 2006/0075803 A1 | 4/2006 | Boisen et al. | |
| 2006/0131500 A1 | 6/2006 | Dalakos et al. | |
| 2007/0196944 A1 | 8/2007 | Chou et al. | |
| 2007/0296838 A1 | 12/2007 | Erdtmann | |
| 2008/0230698 A1 | 9/2008 | Simelgor et al. | |
| 2009/0001271 A1 | 1/2009 | Erdtmann et al. | |
| 2009/0238236 A1 | 9/2009 | Fleury-Frenette et al. | |
| 2010/0148283 A1 | 6/2010 | Shih | |
| 2011/0127073 A1 | 6/2011 | Ryu et al. | |
| 2011/0159638 A1 | 6/2011 | Wang | |
| 2011/0279681 A1 * | 11/2011 | Cabib | G01J 5/06 |
| | | | 348/164 |
| 2011/0291225 A1 | 12/2011 | Klatt | |
| 2012/0032082 A1 | 2/2012 | Pradere et al. | |
| 2015/0061020 A1 | 3/2015 | Yokoyama et al. | |
| 2015/0377711 A1 | 12/2015 | Steffanson et al. | |
| 2018/0073931 A1 | 3/2018 | Steffanson | |
| 2018/0106682 A1 | 4/2018 | Steffanson | |

OTHER PUBLICATIONS

Zhao et al. "Imaging and Characteristics of the Bimaterial Microcantilever FPA Fabricated using Bulk Silicon Processes" Chin.Phys.Lett. vol. 29, No. 5, 2012 pp. 058502-1-058502-4.

Cheng et al. "Optical readout sensitivity of deformed microreflector for uncooled infrared detector: theoretical model and experimental validation" Nov. 2009, J. Opt. Soc. Am. A, vol. 26, No. 11 pp. 2353-2361.

Corbeil et al., "Self-leveling" uncooled microcantilever thermal detector, Applied Physics Letters, Aug. 12, 2002, vol. 81, No. 7, pp. 1306-1308.

Grbovic, Fabrication of Bi-material MEMS detector arrays for THz imaging, Proc. of SPIE vol. 7311 731108, 2009.

Grbovic, Imaging by Detection of Infrared Photons Using Arrays of Uncooled Micromechanical Detectors, May 2008.

Grbovic, Progress with MEMS Based UGS (IR/THz), Proc. of SPIE vol. 6963, 696317, (2008).

International Patent Application PCT/US15/37981, International Search Report and Written Opinion, dated Oct. 13, 2015.

Miao et al., Uncooled IR imaging using optomechanical detectors, ScienceDirect Ultramicroscopy 107 (2007), pp. 610-616.

Toy et al. "Uncooled infrared thermo-mechanical detector array: Design, fabrication and testing", Feb. 2009, Sensors and Actuators A: Physical, p. 88-94.

Wang et al., IR imaging using a cantilever-based focal plane array fabricated by deep reactive ion etching technique, Applied Physics Letters 91, 054109 (2007).

Yu et al. Design and fabrication of high sensitivity focal plane array for uncooled IR imaging, pub. Mar. 25, 2008, Journal of Micromechanics and Microengineering, p. 1-8.

Title: Apparatus and Method for Electromagnetic Radiation Sensing, U.S. Appl. No. 14/750,403, filed Jun. 25, 2015, Inventor(s): Marek Steffanson, et al, Status: Notice of Allowance Mailed—Application Received in Office of Publications, dated Jul. 28, 2017.

Title: Micromechanical Device for Electromagnetic Radiation Sensing, U.S. Appl. No. 14/788,286, filed Jun. 30, 2015, Inventor(s): Marek Steffanson, Status: Docketed New Case—Ready for Examination, dated Aug. 1, 2018.

Title: Micromechanical Device for Electromagnetic Radiation Sensing, U.S. Appl. No. 14/810,363, filed Jul. 27, 2015, Inventor(s): Marek Steffanson, Status: Notice of Allowance Mailed—Application Received in Office of Publications, dated Jun. 21, 2017.

Title: Micromechanical Device for Electromagnetic Radiation Sensing, U.S. Appl. No. 15/804,607, filed Nov. 6, 2017, Inventor(s): Marek Steffanson, Status: Docketed New Case—Ready for Examination, dated Dec. 5, 2017.

Title: Fabrication Method for Micromechanical Sensors, U.S. Appl. No. 15/188,116, filed Jun. 21, 2016, Inventor(s): Marek Steffanson, Status: Notice of Allowance Mailed—Application Received in Office of Publications, dated Aug. 16, 2017.

Title: Fabrication Method for Micromechanical Sensors, U.S. Appl. No. 15/836,535, filed Dec. 8, 2017, Inventor(s): Marek Steffanson, Status: Notice of Allowance Mailed—Application Received in Office of Publications, dated Jun. 21, 2018.

International Patent Application PCT/US2018/037217, International Search Report and Written Opinion, dated Sep. 27, 2018.

* cited by examiner

APPARATUS AND METHOD FOR ELECTROMAGNETIC RADIATION SENSING

RELATED APPLICATIONS

The present application is a continuation application of U.S. patent application Ser. No. 14/750,403, filed Jun. 25, 2015 and issued as U.S. Pat. No. 9,851,256 on Dec. 25, 2017, which claims priority to Prov. U.S. Pat. App. Ser. No. 62/017,724, filed Jun. 26, 2014 and entitled "Apparatus and Method for Electromagnetic Radiation Sensing," the entire disclosures of which applications are hereby incorporated herein by reference.

FIELD OF THE TECHNOLOGY

At least some embodiments disclosed herein relate to electromagnetic radiation detection in general and more particularly but not limited to the sensing of infrared (IR) radiation.

BACKGROUND

U.S. Pat. No. 5,929,440 discloses an electromagnetic radiation detector that has an array of multi-layered cantilevers. Each of the cantilevers is configured to absorb electromagnetic radiation to generate heat and thus bend under the heat proportionately to the amount of absorbed electromagnetic radiation. The cantilevers are illuminated and light reflected by the bent cantilevers are sensed to determine the amount of electromagnetic radiation. The entire disclosure of U.S. Pat. No. 5,929,440 is hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1A:
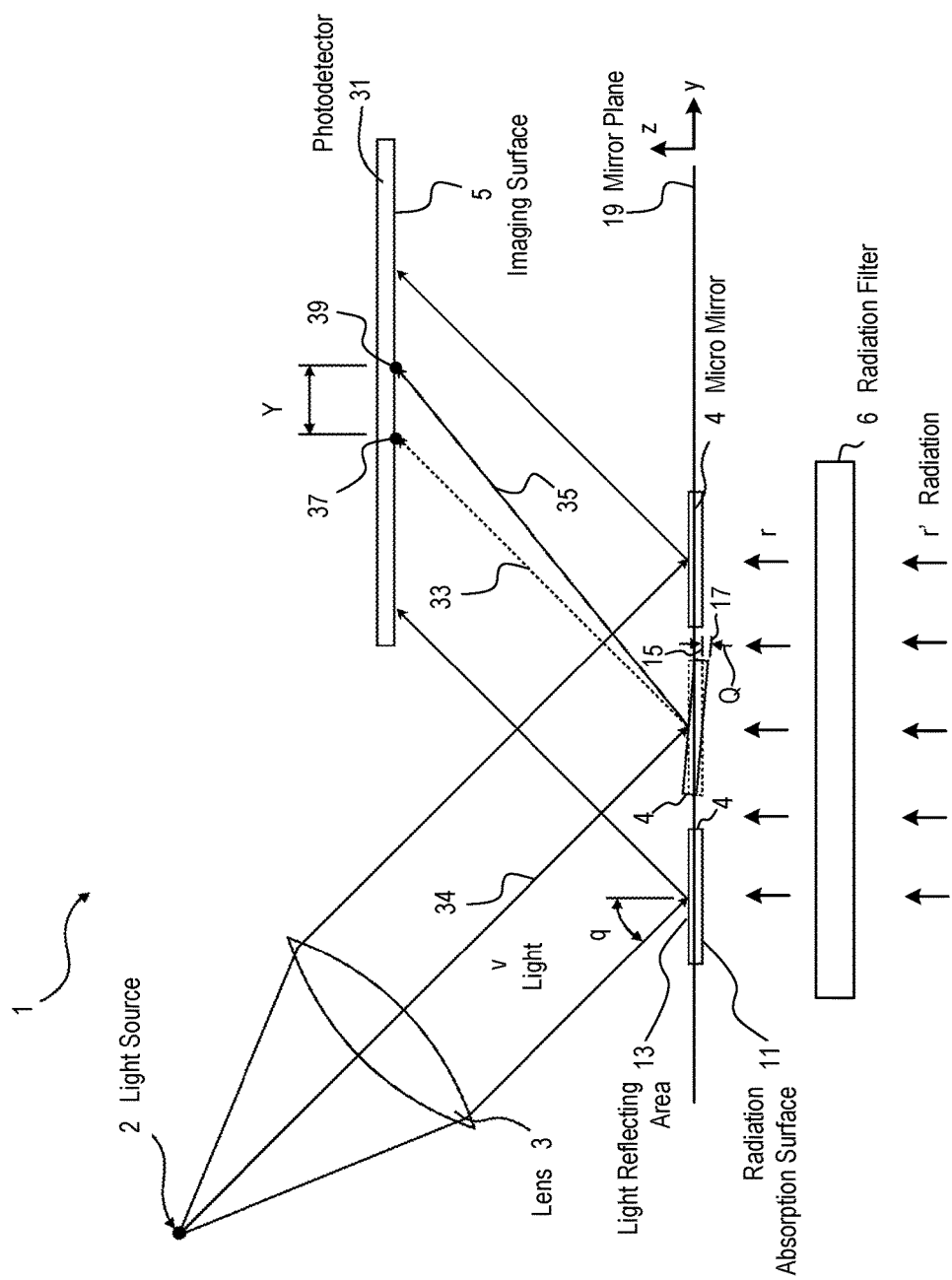
FIG. 1A illustrates an apparatus configured to measure a distribution of electromagnetic radiation according to one embodiment.

FIG. 1A illustrates an apparatus configured to measure a distribution of electromagnetic radiation according to one embodiment.

In FIG. 1A, an electromagnetic radiation sensing apparatus (1) includes an array of micro mirrors (4), a light source (2) to provide light, a lens (3) to direct the light (v) onto the light reflecting areas (13) of the micro mirrors (4), an imaging surface (5) to form an image of light spots reflected by the micro mirrors (4), a photodetector (31) to capture the image form on the imaging surface (5), and an optional radiation filter (6) to filter the incoming radiation (r') to generate a distribution of radiation (r) being absorbed by the radiation absorption surfaces (11) of the micro mirrors (4).

In FIG. 1A, the array of micro mirrors (4) is arranged on a mirror plane (19). For example, the centers of gravity (or geometry) of the micro mirrors (4) are positioned on the mirror plane (19). The imaging surface (5) is arranged in parallel with the mirror plane (19).

Each of the micro mirrors (4) has a radiation absorption surface (11) facing the radiation (r) and/or the radiation filter (6). Each of the micro mirrors (4) has a light reflecting area (13) formed on the opposite surface of the radiation absorption surface (11). The light reflecting area (13) functions as a mirror to reflect the light (v) onto the imaging surface (5). The portion of the light (v) reflected by a particular micro mirror (4) is generally distinct and separate from the portions of light (v) reflected by other micro mirrors (4) and thus form, on the imaging surface (5), a distinct light spot that is associated with the particular micro mirror (4).

For example, the light ray (34) from the light source (2) is reflected by the light reflecting area (13) of a micro mirror (4) to form a reflected light ray (35) reaching the light spot (39) on the imaging surface (5).

In FIG. 1A, in the absence of the incoming radiation (r'), the micro mirrors (4) have initially positions that are aligned with the mirror plane (19). For example, the center planes of the micro mirror (4) are inside the mirror plane (19); and the radiation surfaces (11) of the micro mirrors (4) are in parallel with the mirror plane (19).

In FIG. 1A, the dotted line (33) represents the position of the light ray reflected by a corresponding micro mirror (4) in the initial dotted line position of the corresponding micro mirror (4). After the micro mirror (4) rotates from the dotted line position (15) to the solid line position (17), the light spot of the corresponding micro mirror (4) moves from the initial location (37) to the current location (39). The measurement of the light spot displacement (Y) between locations (37 and 39) can be used to compute the angle of the rotation Q of the corresponding micro mirror (4); and since the rotation Q is proportionately a function of the radiation intensity on the radiation absorption surface (11) of the corresponding micro mirror (4), the measured displacement (Y) can be used to calculate the radiation intensity on the radiation absorption surface (11) of the corresponding micro mirror (4).

The measurement of the light spot displacement (Y) can be performed for each micro mirror (4) in the array and used to determine the distribution of the radiation intensity on the array of the micro mirrors (4).

In one embodiment, the photodetector (31) is used to capture the image formed on the imaging surface (5), identify the individual light spots corresponding to the individual micro mirrors (4) in the array, determine the locations of the light spots, and compute the displacements of the respective light spots and thus the light intensity of the radiation intensity on the mirror mirrors (4).

In FIG. 1A, the y-axis is in the direction of the row of micro mirrors (4) and is parallel to the image plane (19); and the light spot displacement (Y) is on the imaging surface (5) along the y-axis direction. The mirror plane (19) and the imaging surface (5) are separate by a distance along the z-axis that is perpendicular to the mirror plane (19).

In FIG. 1A, the light (v) is directed on the mirror plane (19) with an angle q with the z-axis. Thus, the light (v) generally travels along the direction of the row of micro mirrors (4) onto the mirror plane (19) and after being reflected by the mirror mirrors (4), onto the imaging surface (5) along the direction of the row of micro mirrors (4). The light directing device (e.g., the lens (3)) and the imaging surface (5) are separated apart by a distance along the direction of the row (y-axis). Thus, the light directing device (e.g., the lens (3)) does not interfere with light rays between the micro mirrors (4) and the imaging surface (5). In one embodiment, there are no structural and/or optical components on the light path between the micro mirrors (4) and the imaging surface (5).

In FIG. 1A, the imaging surface (5) is in parallel with the mirror plane (19). Thus, when the micro mirrors (4) are in the initial positions that are aligned with the mirror plane (19), the light reflected by different micro mirrors (4) in the array travels equal distances from the respective light reflecting areas (13) of the micro mirrors (4) to the imaging surface (5). As a result, equal rotations of the micro mirrors (4), due to equal radiation (r) intensity applied on the radiation absorption surfaces (11) of the micro mirrors (4), result in equal light spot displacement (Y) on the imaging surface (5). This arrangement can simplify the calibration for computing the light intensity from the light spot displacement (Y) and/or improve accuracy and/or ensure uniform signal generation and uniform sensitivity in the conversion from radiation intensity to light spot displacement.

Figure 1B:
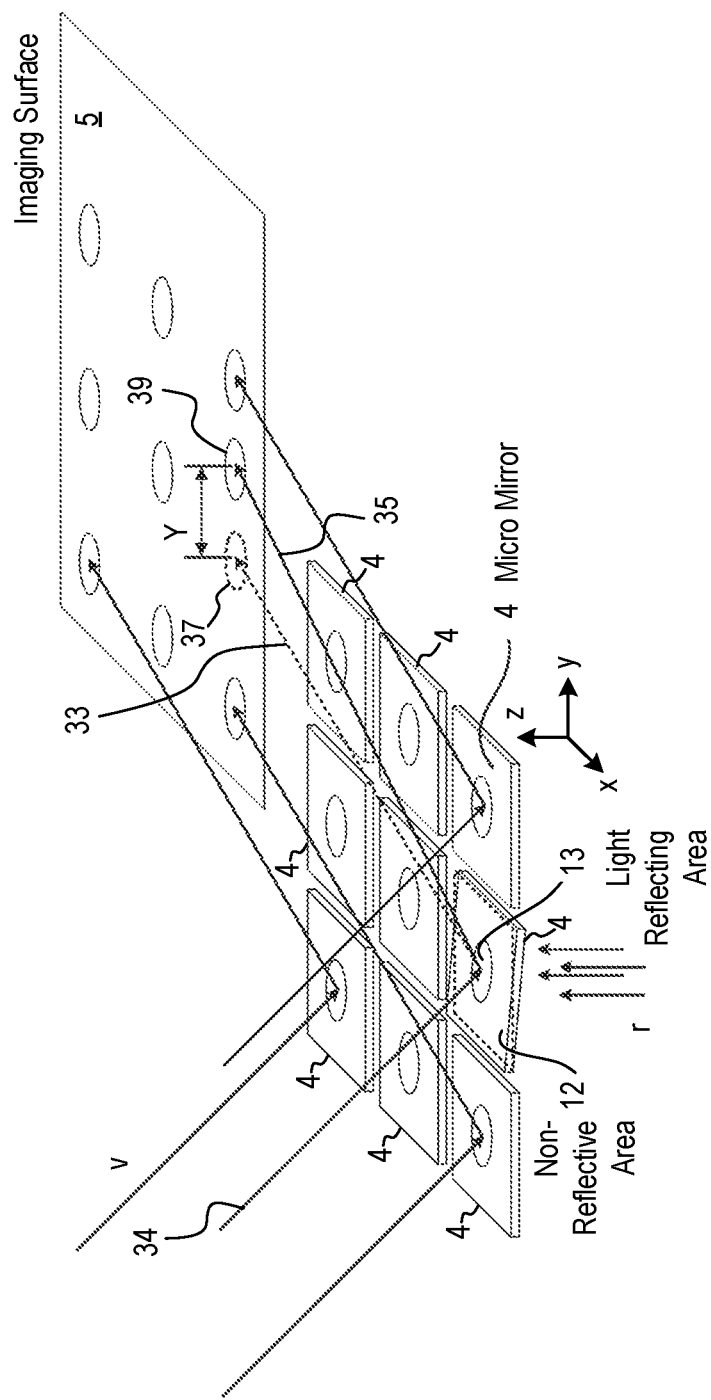
FIG. 1B illustrates the measuring of displacements of reflected light spots on an imaging surface to determine the intensity of electromagnetic radiation at the location of micro mirrors according to one embodiment.

FIG. 1B illustrates the measuring of displacements of reflected light spots on an imaging surface to determine the intensity of electromagnetic radiation at the location of micro mirrors according to one embodiment.

FIG. 1B illustrates an array of 3×3 micro mirrors (4). In general, different numbers of rows and/or columns of micro mirrors (4) can be used in different applications.

FIG. 1B illustrates that each micro mirror (4) has a light reflecting area (13) and a non-reflective area (12) on the surface facing the imaging surface. The shape and size of the light reflecting area (13) of the each micro mirror (4) defines the light spot (39) reflected by the corresponding micro mirror (4) on to the imaging surface (5).

Figure 1C:
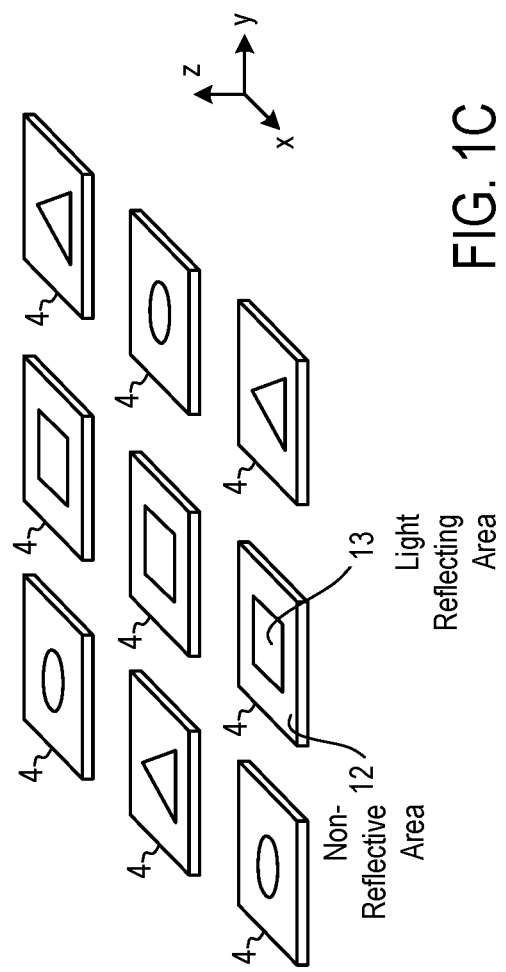
FIG. 1C illustrates an array of micro mirrors having different light reflecting areas according to one embodiment.

In FIG. 1B, the micro mirrors (4) in the array have the same shape and size in their light reflecting areas (13). Alternatively, different micro mirrors (4) in the array may have different shapes and/or sizes in their light reflecting areas (13), as illustrated in FIG. 1C, resulting different reflected light spots on the imaging surfaces. The different optical characteristics of the light reflecting areas (13) can be used to improve the accuracy in correlating the light spots on the imaging surface (5) with the corresponding micro mirrors (4) responsible for reflecting the light spots (39). Different optical characteristics can be achieved by using varying the shape, size, reflection rate, orientation, and/or polarization, etc. of the light reflecting areas (13). Further, symbols or graphical patterns can be applied (e.g., etched or overlaid) on the light reflecting areas (13) to mark the micro mirrors (4) such that the micro mirrors (4) responsible for generating the light spots on the imaging surface (5) can be identified from the shape, size, orientation, polarization, intensity and/or markers of the corresponding light spots captured on the imaging surface (5).

Similar to the arrangement in FIG. 1A, the micro mirrors (4) are arranged in a mirror plane formed by the x-axis and y-axis (x-y plane). The mirror plane and the imaging surface (5) are separate by a distance along the z-axis. The light rays (e.g., 34, 33, 35) generally travels within the planes parallel to the y-axis and the z-axis. The parallel incoming rays (34) reflected by the light reflecting areas (13) of the micro mirrors (4) may or may not be parallel to each other when traveling from the light reflecting areas (13) to the imaging surface (5), depending on the rotations of the micro mirrors (4). When the micro mirrors (4) have the same amount of rotation (e.g., due to the uniform radiation (r)), the reflected lights are parallel to each other and causes the equal light spot displacement (Y), as illustrated in FIG. 2A.

Figure 2A:
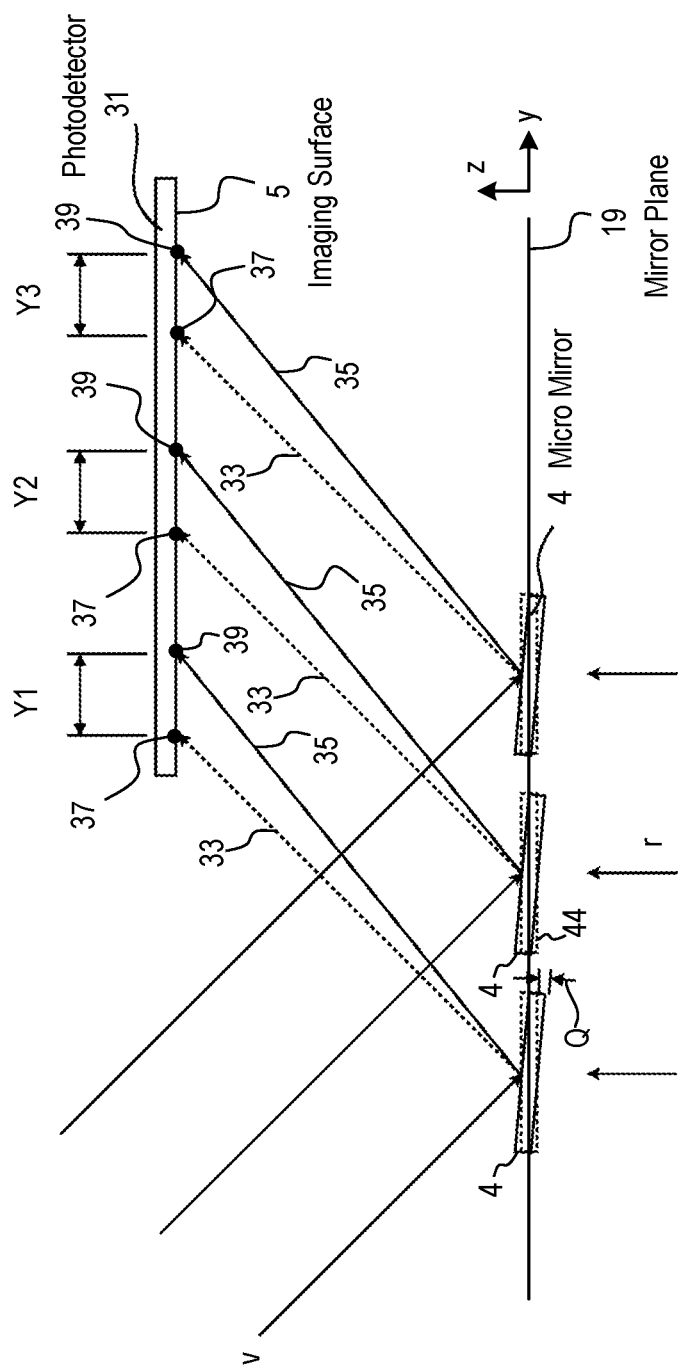
FIG. 2A illustrates a configuration of micro mirrors and an imaging surface to produce equal displacements of reflected light spots on an imaging surface for equal rotations of micro mirrors according to one embodiment.

FIG. 2A illustrates a configuration of micro mirrors and an imaging surface to produce equal displacements of reflected light spots on an imaging surface for equal rotations of micro mirrors according to one embodiment. Equal displacements represent equal sensitivity of the micro mirrors (4) in converting the radiation to light spot displacements.

In FIG. 2A, the imaging surface (5) is in parallel with the mirror plane (19). In absence of the radiation (r), the micro mirrors (4) are aligned in the mirror plane (19), as indicated by the dotted lines (44); and the reflected lights (33) generated by the parallel incoming light (v) are also parallel to each other between the micro mirrors (4) and the imaging surface (5), creating on the imaging surface (5) light spots that have spacing corresponding to the spacing of the micro mirrors (4).

In FIG. 2A, when the uniform radiation (r) causes the uniform rotation (Q) of the micro mirrors (4), the micro mirrors (4) tilt with an angle Q out of the mirror plane (19), as indicated by the solid lines (4); and the reflected lights (35) generated by the parallel incoming light (v) are also parallel to each other between the micro mirrors (4) and the imaging surface (5), creating uniform light spot displacements (Y1, Y2, Y3) on the imaging surface (5). The uniform light spot displacements (Y1, Y2, Y3) correspond to the uniform radiation (r) provided on the absorption surface (11) of the micro mirrors (4).

In FIG. 2A, non-uniform radiation (r) provided on the absorption surface (11) of the micro mirrors (4) generally causes different mirror rotations (Q) and different light spot displacements (Y1, Y2, Y3).

Figure 2B:
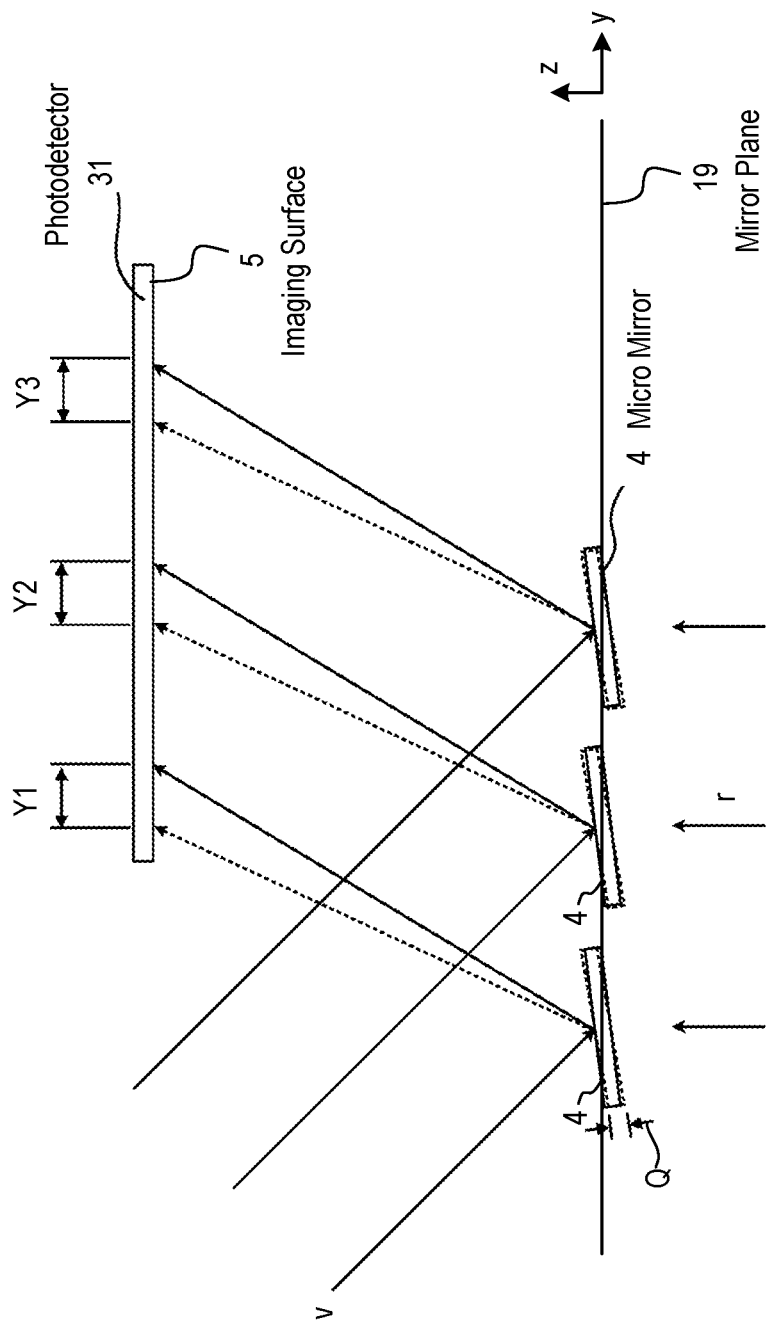
FIG. 2B illustrates another configuration of micro mirrors and an imaging surface to produce equal displacements of reflected light spots on an imaging surface for equal rotations of micro mirrors according to one embodiment.

FIG. 2B illustrates another configuration of micro mirrors and an imaging surface to produce equal displacements of reflected light spots on an imaging surface for equal rotations of micro mirrors according to one embodiment.

In FIG. 2B, in absence of the radiation (r), the micro mirrors (4) are not aligned in the mirror plane (19), as indicated by the dotted lines (44), but have the same initial out-of-plane rotation relative to the mirror plane (19); and, the reflected lights (33) generated by the parallel incoming light (v) are also parallel to each other between the micro mirrors (4) and the imaging surface (5), creating on the imaging surface (5) light spots that have spacing corresponding to the spacing of the micro mirrors (4) on the mirror plane (19).

Similar to FIG. 2A, when the uniform radiation (r) causes the uniform rotation (Q) of the micro mirrors (4) in FIG. 2B, the micro mirrors (4) tilt with an angle Q relative to their initial positions out of the mirror plane (19), as indicated by the solid lines (4); and the reflected lights (33) generated by the parallel incoming light (v) are also parallel to each other between the micro mirrors (4) and the imaging surface (5), creating uniform light spot displacements (Y1, Y2, Y3) on the imaging surface (5). The uniform light spot displacements (Y1, Y2, Y3) correspond to the uniform radiation (r) provided on the absorption surface (11) of the micro mirrors (4).

Figure 2C:
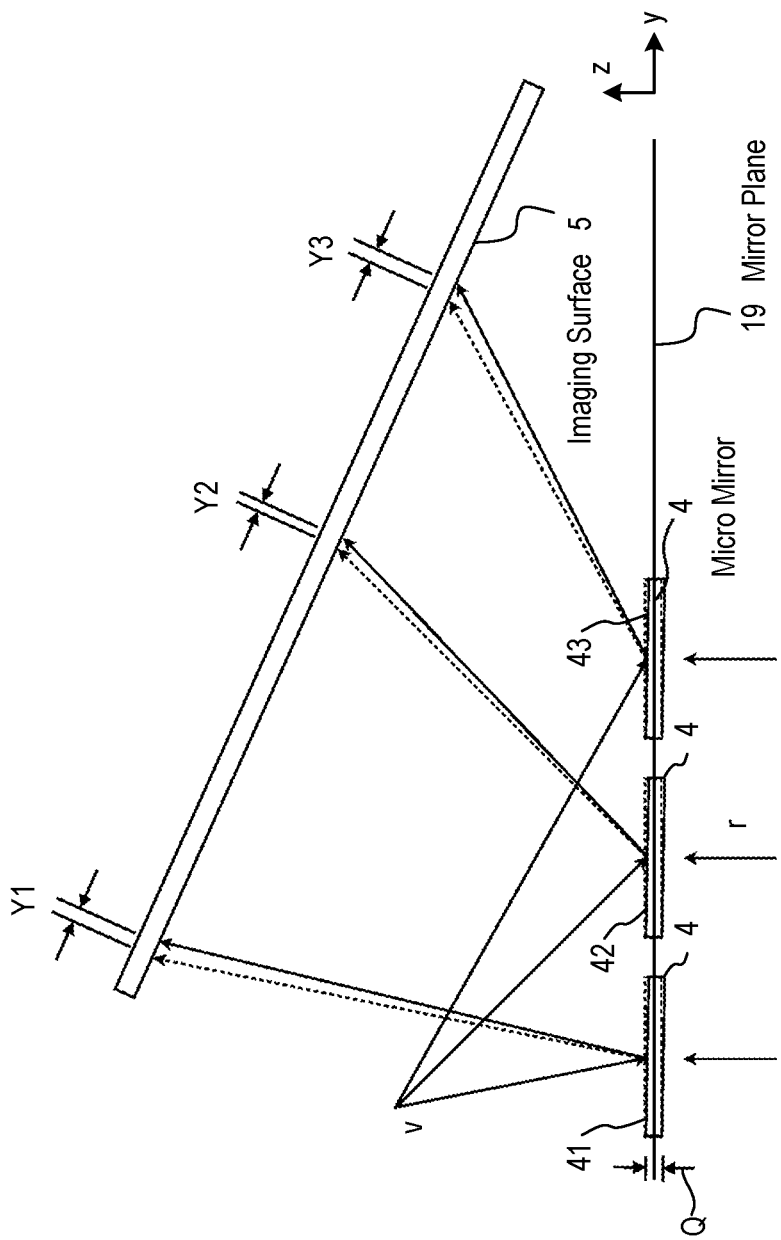
FIG. 2C illustrates a further configuration of micro mirrors and an imaging surface to produce minimal displacements deviation of reflected light spots on an imaging surface for equal rotations of micro mirrors upon non-collimated illumination according to one embodiment.

FIG. 2C illustrates a further configuration of micro mirrors and an imaging surface to produce minimal displacements deviation of reflected light spots on an imaging surface for equal rotations of micro mirrors upon non-collimated illumination according to one embodiment.

In FIG. 2C, the mirror plane (19) and the imaging surface (5) are not parallel to each other. The projection of the incoming light rays (v) on to the micro mirrors (4) is not parallel. Such non-collimated projection can be created with a point light source or through a beam splitter. Further such projection can be created without utilizing any lenses between the point source and the micro mirrors (4). A non-collimated projection will result in a different illumination angle (angle of incident) of each micro mirror (41, 42, 43). Hence a spatial arrangement between the micro mirror plane (19) and the imaging surface (5), where same rotations (Q) of the micro mirrors (4) will generally result in a different light spot displacements (Y1, Y2, Y3). However, preferably the micro mirror plane (19) and the imaging surface (5) are arranged such that with corresponding projection angles of the incoming light rays (v) on to the micro mirrors (4) when the micro mirrors (4) have the same rotation (Q) of a predetermined amount (e.g., 1 degree rotation from the unradiated mirror position), the corresponding light spot displacements of the two outermost micro mirrors (41 and 43) of a row (or at least three outermost corner micro mirrors in an array) (Y1, Y3) are substantially equal to each other. Hence, when uniform radiation (r) causes the uniform rotation (Q) of the micro mirrors (4), the light spot displacement of any micro mirrors between the two outermost micro mirrors (41 and 43) in a row will be smaller than the two substantially equal light spot displacements of the two outermost micro mirrors (41 and 43). Such arrangement minimizes light spot displacement deviations when uniform radiation (r) causes the uniform rotation (Q) of the micro mirrors (4) that are illuminated with non-collimated light.

Preferably, the micro mirrors (41 and 43) located at the beginning and the end of the row of micro mirrors (4) have the same light spot displacements (Y1 and Y3) when the micro mirrors (41 and 43) rotate the same amount (e.g., 1 degree) from the unradiated mirror position (dotted line positions). Such configuration can be achieved when the two outermost micro mirrors (41 and 43) in a row have substantially equal light spot displacements upon a rotation of the same amount (e.g., 1 degree). In one embodiment, at least three outermost micro mirrors (4) (e.g., located at the corners of the array in the mirror plane (19) are configured to have substantially equal light spot displacements upon a rotation of a predetermined amount (e.g., 1 degree).

More preferably, the micro mirrors (41, 42 and 43) located at the beginning, in the middle, and at the end of the row of micro mirrors (4) have the most minimal light spot displacements deviation (Y1, Y2 and Y3) when the micro mirrors (41, 42, and 43) rotate the same amount (e.g., 1 degree) from the unradiated mirror position (dotted line positions). Such configuration can be achieved when the two outermost micro mirrors (41 and 43) in a row are configured to have substantially equal light spot displacements upon a rotation of a predetermined amount (e.g., 1 degree). Micro mirrors (4) arranged in an array in the mirror plane (19) can have at least three outermost micro mirrors (e.g. corner) having substantially equal light spot displacements upon a rotation of the same amount (e.g., 1 degree).

FIG. 2C illustrates an example of adjusting the projection angle of the incoming rays (v) to minimize the light spot displacement deviations (Y1, Y2 and Y3) of the corresponding micro mirrors (41, 42 and 43). Alternatively, or in combination, the initial positions of the micro mirrors (4) can be configured to minimize the light spot displacement deviations (Y1, Y2 and Y3) for a predetermined amount of rotation caused by the same radiation provided on the respective micro mirrors (4).

Figure 3A:
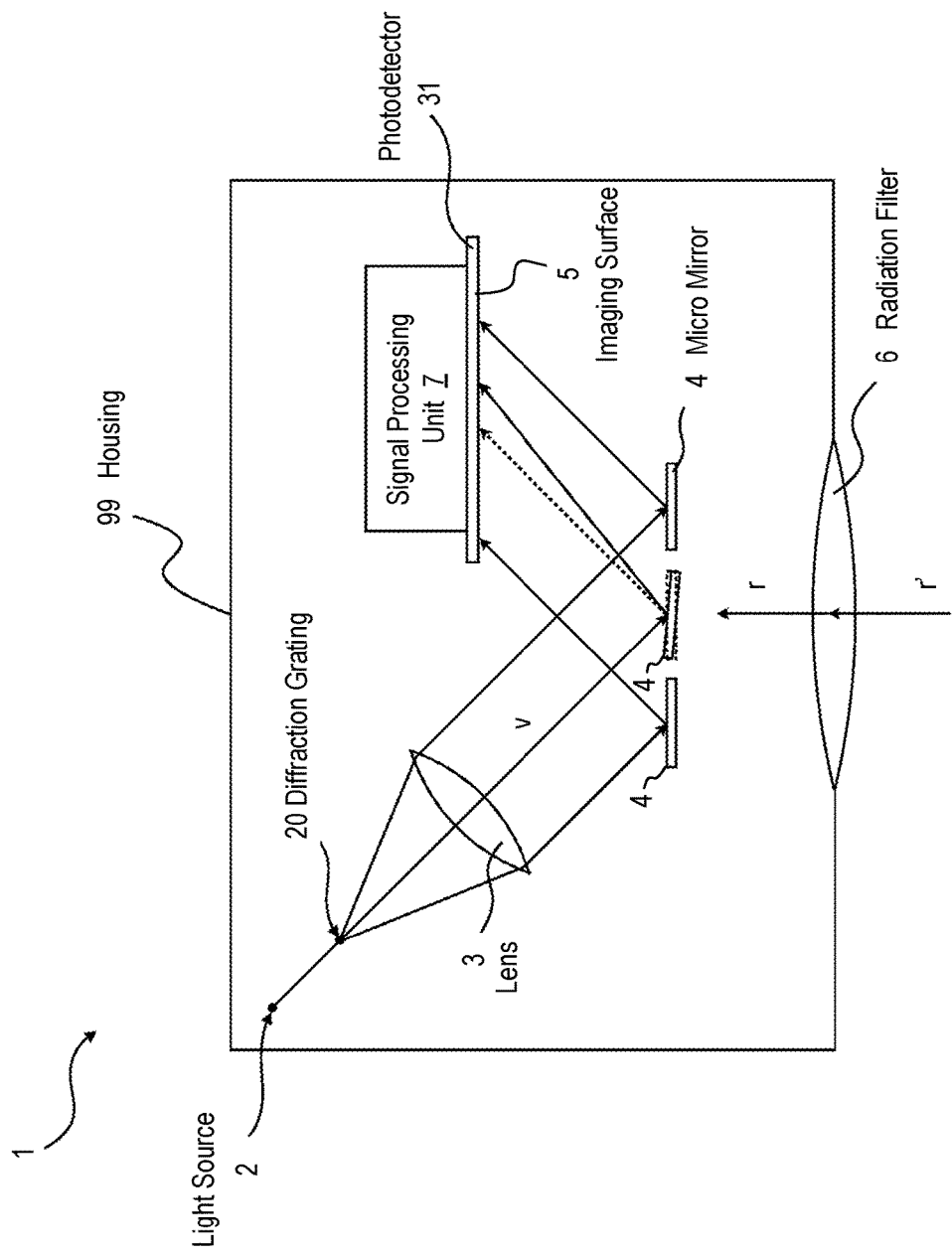
FIG. 3A illustrates a radiation sensing apparatus according to one embodiment.

FIG. 3A illustrates a radiation sensing apparatus according to one embodiment. The radiation sensing apparatus (1) illustrated in FIG. 3A has a housing (99) enclosing a light source (2), a diffraction grating (or a beam splitter) (20), a lens (3), an array of micro mirror (4), a photodetector (31) having an imaging surface (5), a signal processing unit (7) and a radiation filter (6).

In some embodiments, the radiation sensing apparatus (1) further includes a signal transmitting unit coupled with the signal processing unit (7) to transmit the image data captured by the photodetector (31) and/or the measuring data processed by the signal processing unit (7) indicating the light spot displacements (Y), the mirror rotations (Q) and the intensity of the radiation (r).

In FIG. 3A, the micro mirrors (4) and the imaging surface (5) are arranged to have equal light spot displacements (or minimized displacement deviation) for equal mirror rotations caused by equal radiation intensity (e.g., as illustrated in FIGS. 2A, 2B, and 2C).

In FIG. 3A, the plane of the micro mirrors (4) and the imaging surface (5) are parallel to each other; and the diffraction grating (20) is disposed at the focal point of the lens (3) to direct parallel light rays (v) to the micro mirrors (4). When the micro mirrors (4) and the imaging surface (5) are arranged in an angle as illustrated in FIG. 2C, a point light source (2) (e.g., created via the diffraction grating (20)) may be used without the lens (3), or with the lens (3) where the diffraction grating (20) is not disposed at the focal point of the lens (3).

In one embodiment, the radiation filter (6) includes a radiation imaging lens (e.g., an infrared lens made of e.g., Germanium, Silicon, polymer, and the like). The radiation imaging lens is arranged in relation with the micro mirrors (4) to form an image of the radiation (e.g., infrared radiation) on the plane of the micro mirrors (4). Thus, the radiation intensity corresponding to the light spot displacement on the imaging surface (5) produced by a micro mirror (4) corresponds to the intensity of a pixel of the radiation image form via the radiation filter (6) at the location of the respective micro mirror (4).

Some of the figures, such as FIG. 1A, FIG. 2A, FIG. 2B, and FIG. 3A illustrate implementations where that the imaging surface (5) is arranged on a surface of the photodetector (31), some embodiments provide an imaging surface that is separate and/or remote to an imaging sensor configured to capture the image formed on the imaging surface.

Figure 3B:
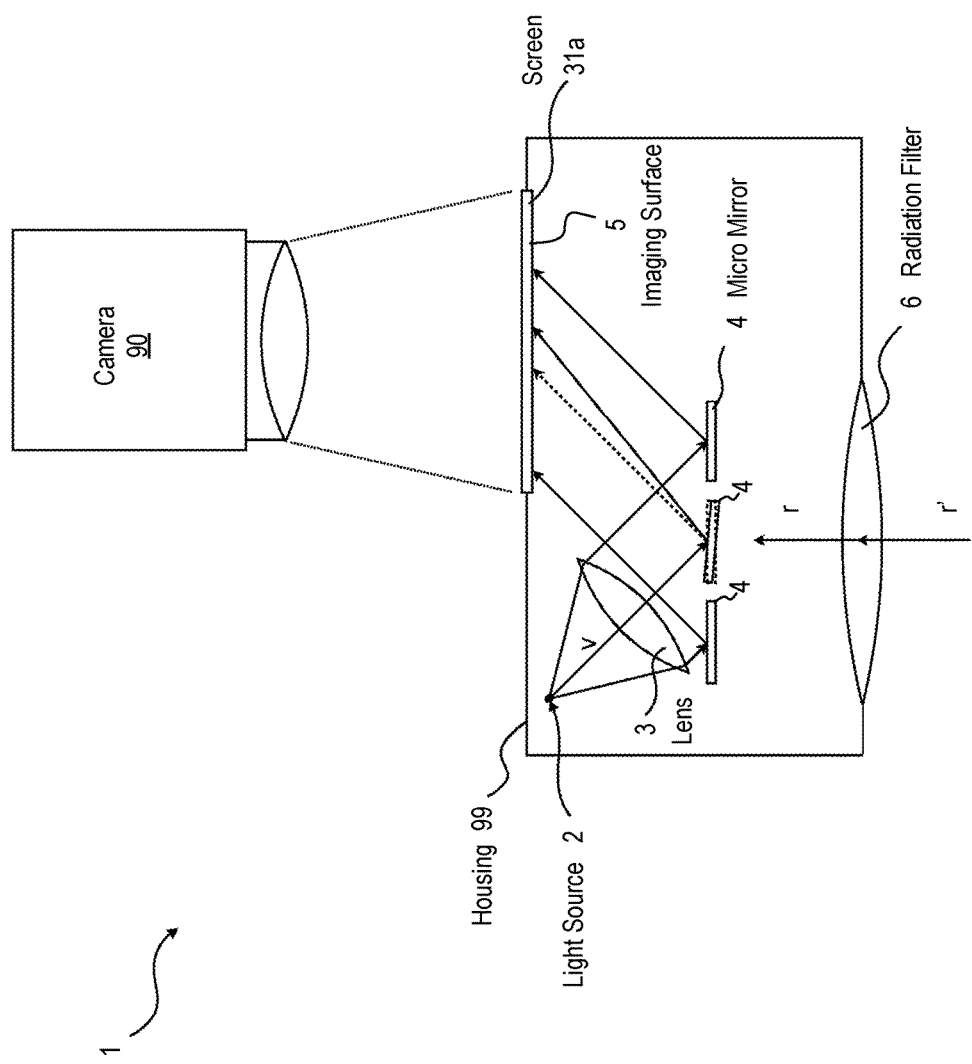
FIG. 3B illustrates another radiation sensing apparatus according to one embodiment.
Figure 3C:
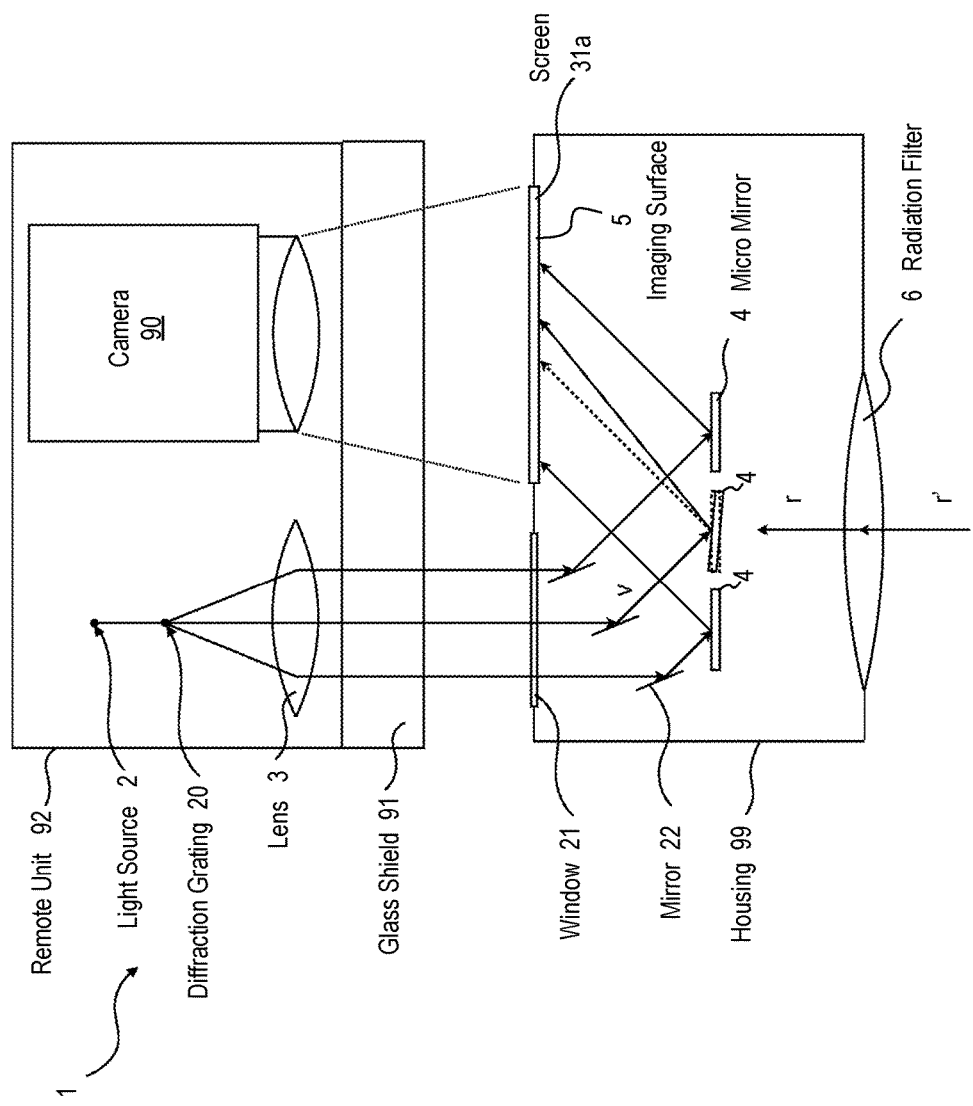
FIG. 3C illustrates a further radiation sensing apparatus according to one embodiment.

For example, the imaging surface can be implemented as a semi-transparent screen; and a remote camera can be used to photograph or record the light sport image formed on the semi-transparent screen from a distance to measure the light spot displacements (Y), as illustrated in FIGS. 3B and 3C.

FIG. 3B illustrates another radiation sensing apparatus according to one embodiment. In FIG. 3B, the radiation sensing apparatus has two separate units, including an imaging unit housed in housing (99) and a remotely positioned camera (90) configured to capture the light spot image formed on the imaging surface (5).

In FIG. 3B, the light spot image is formed on the imaging surface (5) of e.g. a semi-transparent screen (31a) mounted on a window of the housing (99).

Similarly to FIG. 3A, the housing (99) in FIG. 3B encloses a light source (2), a diffraction grating (20), a lens (3), an array of micro mirror (4), and a radiation filter (6). However, instead of having enclosing a photodetector (31) and a signal processing unit (7) in a way as illustrated in FIG. 3A, the housing (99) in FIG. 3B has a window to mount the semi-transparent screen (31a). The light spot image formed on the imaging surface (5) of the screen (31a) can be captured by the remote camera (90) for the determination of the light spot displacement (Y), the mirror rotation (Q), the intensity of the radiation (r).

In some embodiments, the remote camera (90) includes signal processing unit (7) configured to detect the light spots generated by the respective micro mirrors (4) from the photo image of the screen (31a) captured by the camera and compute the radiation intensity at the locations of the micro mirrors (4).

FIG. 3C illustrates a further radiation sensing apparatus according to one embodiment. In FIG. 3C, the remote unit (92) includes not only the camera (90), but also the light source (2), the diffraction grating (20) and lens (3), protected by a glass shield (91). Since the sensitive and/or costly elements are protected in a remote unit (92), the imaging unit housed in the house (99) can be used in a harsh environment.

In FIG. 3C, the housing (99) includes a window (21) to receive parallel light rays formed by the light source (2), the diffraction grating (20) and the lens (3) in the remote unit (92). A set of mirrors (22) is used to direct the parallel light rays onto the micro mirrors (4) to generate the light spot image on the imaging surface (5) of the semi-transparent screen (31a). The radiation filter (6) forms a radiation image on the radiation absorption surfaces (11) of the micro mirrors (4), which rotate proportionately to the absorbed radiation.

In FIG. 3C, the camera (90) is configured to capture the light spot image formed on the imaging surface (5) of the screen (31a).

FIG. 3C illustrates an example in which the screen (31a) is mounted on a window of the housing (99). Alternatively, the screen (31a) having the imaging surface (5) can be configured inside the housing (99) viewable through a transparent window (e.g., configured at the window where the screen (31a) is mounted in FIG. 3C).

FIG. 1C illustrates an array of micro mirrors having different light reflecting areas according to one embodiment. The different light reflecting areas (13) of different micro mirrors (4) causes the light spots (39) formed by the light (v) reflected by the respective micro mirrors (4) to have different shapes. Thus, ambiguities in identifying the light spots formed by different micro mirrors (4) can be resolved based on the association of the shapes of the micro mirrors (4) and the shapes of the light spots (39).

In FIG. 1C, different light reflecting areas (13) are configured to at least distinguish the light spots generated by the adjacent micro mirrors (4) in a row of micro mirrors (4) along the y-axis in the direction where the light spots travel the displacement (Y) in response to the rotation (Q) of micro mirrors (4) caused by the absorption of the energy of the radiation (r). In some implementations, each micro mirror (4) in a row of micro mirrors (4) is individualized with an optical marking such that the light spot generated by the respective micro mirror (4) can be distinguished from the light spots generated by other micro mirror (4) in the row. In general, the light spots of different rows of the micro mirrors (4) may also be optionally marked with different optical characteristics. Further, different optical characteristics of the light spots can also be created at least in part via the light directing component of the apparatus, as illustrated in FIG. 4 and discussed further below.

Figure 4:
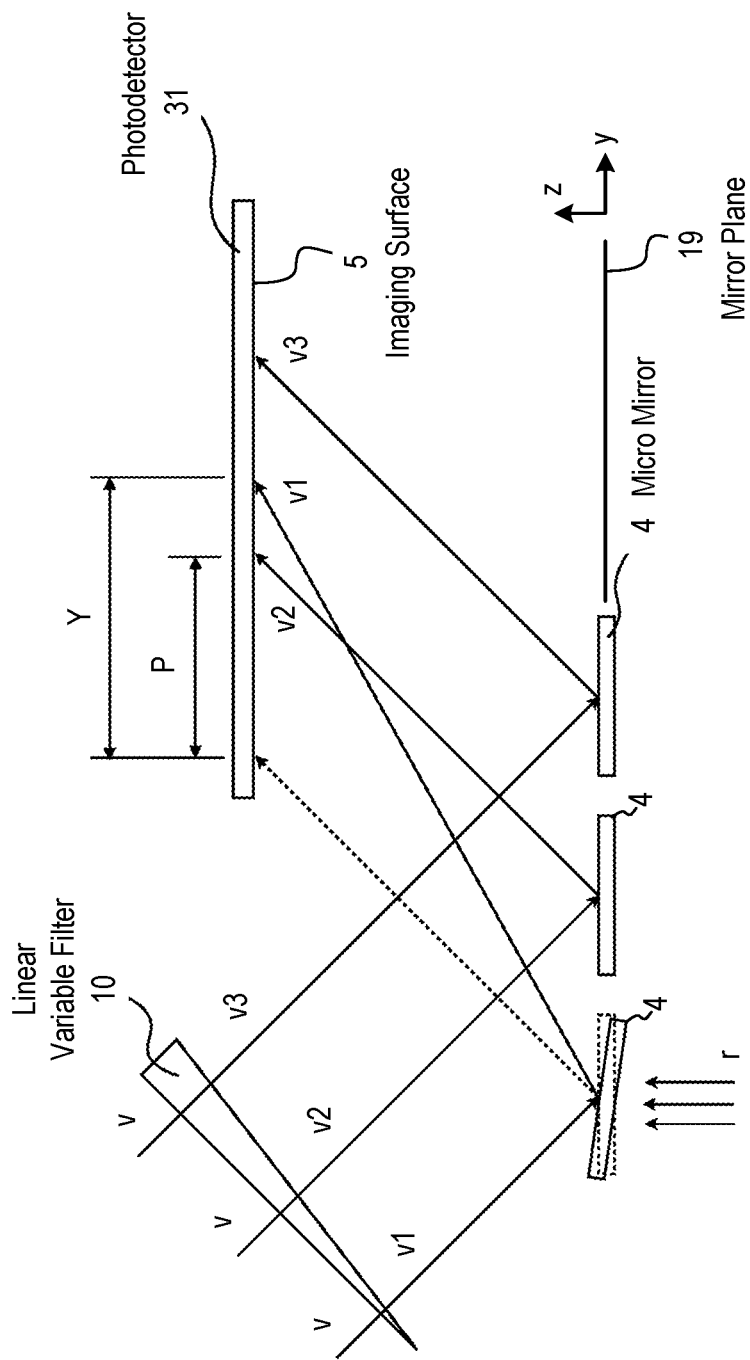
FIG. 4 illustrates a radiation sensing apparatus configured with a light directing device to generate light spots of different characteristics according to one embodiment.

FIG. 4 illustrates a radiation sensing apparatus configured with a light directing device to generate light spots of different characteristics according to one embodiment.

In FIG. 4, the incoming light rays (v) go through a linear variable filter (10) such that the filtered light rays (v1, v2, and v3) have varying intensity. As a result, light rays reflected by different micro mirrors (4) in a row along the direction of slight spot displacement (Y) along the y-axis have different light intensities. Thus, the intensity of the light spots can be used to resolve ambiguity in the identification of micro mirrors (4) that generate the respective light spots on the imaging surface (5).

For example, in FIG. 4, the light spot pitch (P) is the distance between adjacent light spots along the direction of slight spot displacement (Y) along the y-axis when the micro mirrors (4) are not subjected to the radiation (r). When the radiation intensity on one of the micro mirrors (4) causes a light spot displacement (Y) that exceeds the light spot pitch (P), there could be situations where the light spots are out of sequence in comparison with the sequence of the micro mirrors (4) that generate the respective light spots. For example, in the example of FIG. 4, the light spot generated by ray (v1) is between the light spot generated by rays (v2 and v3); however, the micro mirror reflecting the ray (v1) is not between the micro mirrors (4) reflecting the rays (v2 and v3). Thus, if the light spots are correlated with the micro mirrors (4) based solely on the sequences of the light spots, measuring results would be erroneous.

In FIG. 4, since the light spots generated by the light rays (v1, v2, and v3) have varying intensity, thus, the intensity of the light spots form on the imaging surface can be ranked to determine the order of the light spots that corresponds to the order of the micro mirrors (4) in the row that reflect the respective light rays (v1, v2, and v3). Thus, the potential measuring errors due to the out of order displacements of light spots, as discussed above, can be eliminated.

In one embodiment, the linear variable filter (10) causes the rays (v1, v2, and v3) to have linear variation in light intensity in the direction of the y-axis (the direction of the light spot movement (Y)). Alternatively, other types of light intensity distributions can be used. In general, the light rays (v1, v2, and v3) can be individually marked via optical characteristics, such as shape, size, intensity, polarization, symbols, etc. via the filter (10) and/or the light reflecting areas (13) of the micro mirrors (4).

The radiation filter (6) discussed above can include a radiation imaging lens to form an radiation image on the array of the micro mirrors (4). In some embodiments, the radiation filter (6) may include filters having different filtering characteristics for different portions of the micro mirrors (4) in the array, as illustrated in FIG. 5.

Figure 5:
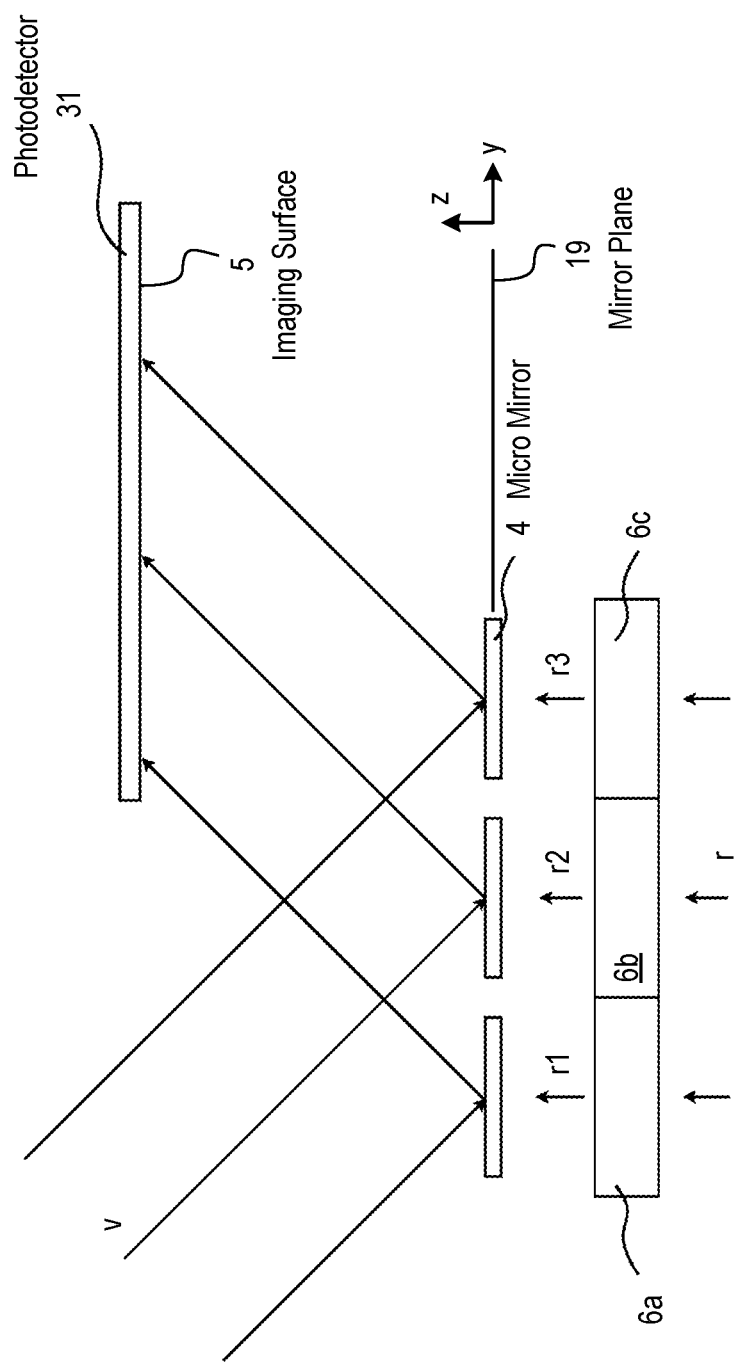
FIG. 5 illustrates a radiation sensing apparatus configured with multiple radiation filters of different filtering characteristics for different portions of micro mirrors according to one embodiment.

FIG. 5 illustrates a radiation sensing apparatus configured with multiple radiation filters of different filtering characteristics for different portions of micro mirrors according to one embodiment.

In FIG. 5, different portions (6a, 6b, and 6c) of the radiation filter (6) have different filtering ranges. Thus, the uniform radiation (r) can be filtered by the different portions (6a, 6b, and 6c) of the radiation filter (6) to form different radiation images (r1, r2 and r3) for the different portions of the array of the micro mirrors (4).

In FIG. 5, the variation of the different radiation filters (6a, 6b, and 6c) are arranged in the direction of the light spot displacement (Y) along the y-axis. Alternatively, or in combination, variation of the different radiation filters (6a, 6b, and 6c) can be made in a plane parallel to the mirror plane (19) and perpendicular to the y-axis (e.g., in the x-axis illustrated in FIG. 1B).

The different filters can be used by the radiation sensing apparatus for multi-spectral sensing.

Figure 6:
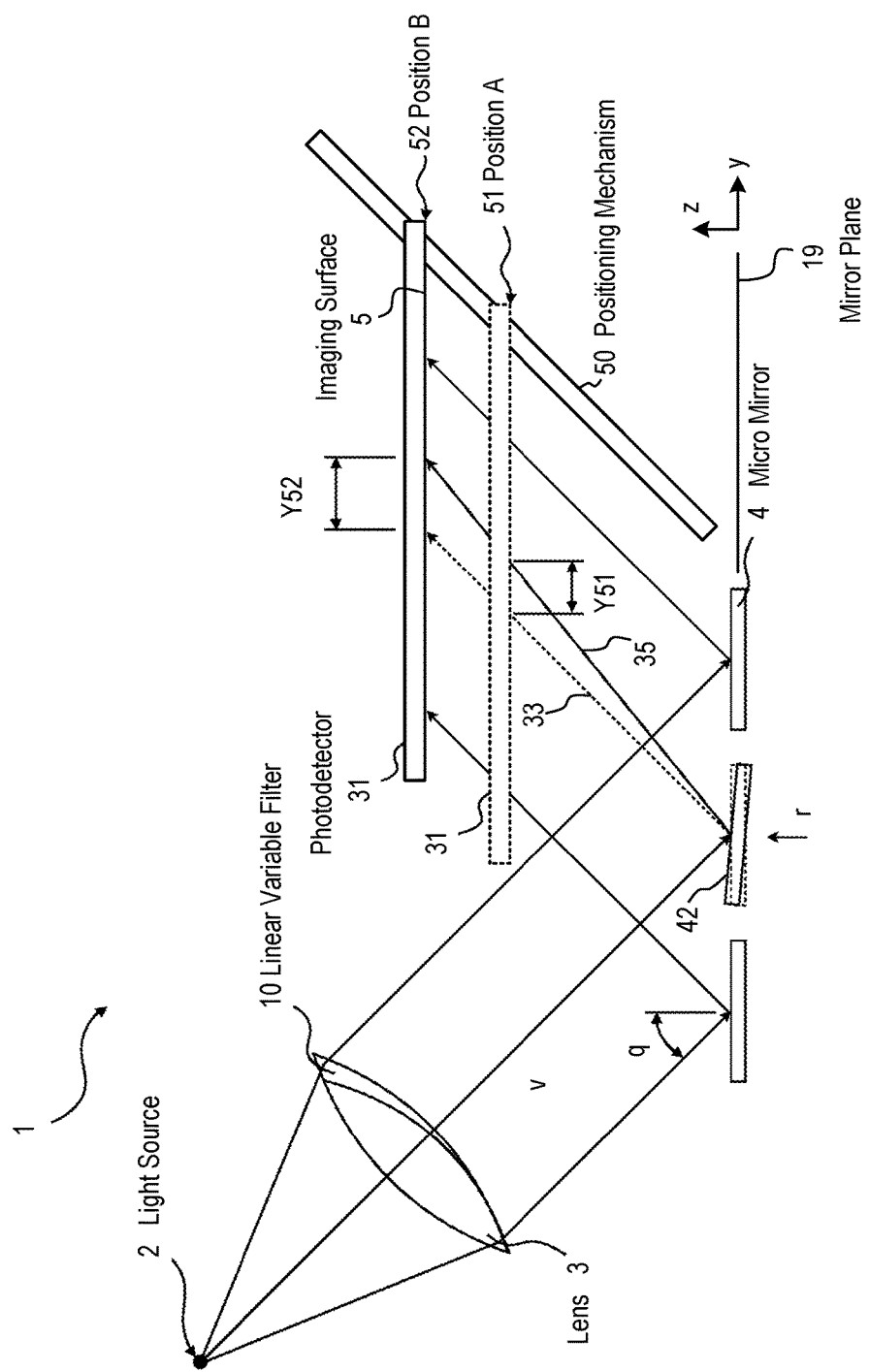
FIG. 6 illustrates a radiation sensing apparatus configured with a positioning mechanism adjustable to change a distance between the mirror array and an imaging surface according to one embodiment.

FIG. 6 illustrates a radiation sensing apparatus configured with a positioning mechanism adjustable to change a distance between the mirror array and an imaging surface according to one embodiment.

In FIG. 6, the position of the imaging surface (5) can be adjusted automatically or manually via the positioning mechanism (50). The adjustment of the position of the imaging surface (5) adjusts the sensitivity and measurement ranges of the radiation intensity.

In FIG. 6, when the micro mirror (42) rotates from a dotted line position to the solid line position, the position of the reflected ray changed correspondingly from the dotted line position (33) to the solid line position. When the imaging surface (5) of the photodetector (31) (or a semi-transparent screen (31a)) is at the position B (52), the light displacement is Y52. When the imaging surface (5) of the photodetector (31) (or a semi-transparent screen (31a)) is at the position A (52), the light displacement is Y51. Thus, with the same rotation of the micro mirror (42), the light spot displacement is enlarged from Y51 to Y52, when the imaging surface (5) is moved to increase the distance between the mirror plane (19) and the imaging surface (5) and thus increases the measuring sensitivity. On the other hand, the moving the imaging surface (5) closer to the mirror plane (19) decreases the sensitivity and thus expands the measurement range.

In one embodiment, the positioning mechanism (50) is configured to move the imaging surface generally in the direction of the reflected rays (33, 35) to keep the light spot image substantially centered on the imaging surface.

In some embodiments, the linear variable filter (10) is integrated with a lens (3) to generate the parallel light rays (v) having varying light intensity in the direction of light spot displacement, in a way as illustrated in FIG. 6.

The radiation sensing apparatus discussed above have many applications, such as non-visual environment monitoring and monitoring of human presence for security and safety, energy savings, fire detection, people counting and behavior analysis. The radiation sensing apparatuses may use the infrared sensing technology in general and more particular uncooled thermal imaging.

In one embodiment, a radiation sensing apparatus includes a radiation detection sensor including a plurality of micromechanical radiation sensing pixels having a reflecting top surface and configured to deflect light incident on the reflective surface as a function of an intensity of sensed radiation. In some implementations, the apparatus can provide adjustable sensitivity and measurement range, as illustrated in FIG. 6. In some implementations, the apparatus can provide adjustable spectral and multi-spectral sensing abilities, as illustrated in FIG. 5. The apparatus can be utilized for human detection, fire detection, gas detection, temperature measurements, environmental monitoring, energy saving, behavior analysis, surveillance, information gathering and for human-machine interfaces.

Details of one or more implementations of the subject matter described in this specification are set forth in the accompanying drawings and the description. Other features, aspects, and advantages will become apparent from the description, the drawings, and the claims. Note that the relative dimensions of the following figures may not be drawn to scale. Like reference numbers and designations in the various drawings indicate like elements.

Non-visual environment monitoring and monitoring of human presence can be utilized in applications for security and safety, energy savings, fire detection, people counting and behavior analysis. One technology used for these kinds of applications is infrared technology, in particular uncooled thermal imaging. Every object in our environment has a unique thermal footprint and therefore thermal imaging offers detection of human presents in an enclosed environment with a very high accuracy and negligible false alarm rate. Human body temperature and emissivity in the long wave infrared band is in most cases distinguishably higher than the thermal footprint of typical indoor and outdoor environmental surroundings. Thermal imaging with a limited spatial resolution can be sufficient to accurately detect humans at short distances without revealing the individual's identity. This aspect of environmental and human detection and monitoring is of general interest with regards to privacy protection. Current thermal imaging technology solutions are inadequate for low-cost, high-volume applications due to their production complexity and expenses. A need exists for ubiquitous limited spatial resolution infrared imagers at a commodity price. One example of a potentially inexpensive thermal imager with a limited spatial resolution is based on an uncooled thermo-mechanical bi-material microelement sensor, which converts incident infrared radiation into a micromechanical displacement. The microelement is often referred to as a micro-cantilever or micro-mirror. The operational principle is based on the bimaterial effect, where a material compound mismatch of coefficients of thermal expansion leads to a micromechanical motion upon temperature change. In some implementations one microelement represents one radiation sensing pixel and the entire sensors consists of an array of microelements.

Referring to FIG. 3A, the electromagnetic radiation detector 1 includes a housing (99) with a light source (2), a lens or collimator (3), an array of micro mirrors (4), a photodetector (31) with an imaging surface (5) and a radiation filter (6). Generally the photodetector (5) converts light into electrical signals to detect the position of the light spots of generated by the lights reflected by the micro mirrors (4) that forms a micromechanical pixel array.

In one embodiment, each micro mirror (4) is a micromechanical radiation sensing pixel having a reflecting top surface and a radiation absorbing bottom surface. The micro mirrors (4) are arranged in a two dimensional array. The micromechanical radiation sensing pixels exhibit a reversible micromechanical displacement of the reflecting top surface upon radiation absorption. The initial incident radiation passes through the filter (6) whereupon at least one characteristic of radiation is altered and the filtered radiation is provided on the micro mirror (4).

In some implementations the micromechanical pixel array of micro mirrors (4) can be enclosed in a specific operational pressure or gas sealing with transparent optical windows on the top and the bottom of the sealing chamber.

For example, the pixel disclosed in U.S. Pat. App. Ser. No. 62/004,805, filed May 29, 2014 and entitled "Micromechanical Devices for Electromagnetic Radiation Sensing and Methods to Produce the Same", can be used in the pixel array (4), the entire disclosure of which application is hereby incorporated herein by reference.

The light source (2) is illuminating the top surface of the micro mirrors (4) with light rays (v). The reflectors (e.g., the light reflecting area (13)) of the micromechanical radiation sensing pixels (e.g., the micro mirrors (4)) reflect the illuminated light rays (v) onto the imaging surface (5) of the photodetector (31). Between the light source (2) and the micro mirrors (4) is positioned a collimator or lens (3) which collimates and produces substantially parallel light rays (v) to fall onto the micro mirrors (4). The illumination of the topside of the micromechanical pixel array by the light rays v does not substantially influence, actuate, displace or rotates the reflectors of the micro mirrors (4). The reflectors of the micro mirrors (4) generate an angular motion primarily due to local temperature rise upon absorption of the radiation (r). The temperature dependent actuation of the micro mirror can be generally implemented via a bi-material effect for temperature sensing.

As illustrated in FIG. 1A, the collimated light rays as marked with (v) fall onto the reflectors of the micro mirrors (4) with a fixed angle of incidence q and are reflected with an angle of reflection and fall onto the imaging surface (5) of the photodetector (31). Initially the reflected light rays have substantially identical collimated arrangement as the incident light rays.

In the schematic illustration of FIG. 1B, an array of 3×3 micromechanical pixels is demonstrated as a sensor array. More or less pixels can be used in various embodiments. In FIG. 1B, a micro mirror (4) exhibits an angular displacement upon backside irradiation with radiation intensity r. In some implementations the amount of the tilt of the micro mirror (4) corresponds to the amount of absorbed radiation intensity. The micromechanical motion of the micro mirror (4) of the corresponding pixel is generated by absorption of irradiated electromagnetic radiation from the bottom side. The absorbed irradiation generates a temperature increase on the micro-structure, where a bi-material actuator induces an angular micromechanical motion.

Due to the position change in the reflector of the micro mirror (4), the corresponding light ray (33) undergoes an angle of reflection change by the angular amount and the displaced reflected light ray is illustrated as ray (35). The initial positions of the micro mirror (4) and the reflected light ray (33) are shown in FIG. 1B dotted lines. The micromechanical angular displacement is translated to a light ray displacement (Y), which is detected via the photodetector (31). In one embodiment, the imaging surface (5) of the photodetector captures the incident light rays as light spots of a specific diameter. The light spots (37, 38) are schematically illustrated in FIG. 1B as round features. In conclusion the incident radiation intensity (r) is translated via a micromechanical displacement and an optical setup into a light spot displacement (Y) on an imaging surface (5) captured by a photodetector (31).

The electromagnetic radiation detector (1) includes a radiation filter (6) which has at least one radiation filtering capability. The filter (6) may change the bandwidth, spectral intensity, etc. of the filtered radiation. In some implementations, the filter (6) can be an optical window consisting of a specific material such as Germanium, Silicon, polymer, etc. In addition the optical window material may include optical coatings or gratings. In some implementations, the optical radiation filter (6) can be a radiation imaging lens that images incident irradiation onto the radiation absorption side of the micro mirrors (4). The filter ability is not limited to any wavelength or wavebands. For example the radiation filter (6) may be a Germanium imaging lens including an antireflective optical coating for the long wave infrared region (LWIR). Another example can include only a plane Silicon optical window covered with a narrowband optical transmission coating that is transparent only to a specific wavelength. The latter example can be used as a gas sensor or for multiband sensing with several detectors, where each detector is sensitive to one specific wavelength. First example can be used for example for thermal imaging of human presence.

In one embodiment, the radiation filter (6) is an exchangeable part of the electromagnetic radiation detector (1). For example, one radiation filter (6), which is highly transparent in the LWIR region can be manually or automatically exchanged with a radiation filter (6) that is for example transparent for only the mid wave infrared (MWIR) region. With such apparatus the end user has a liberty to easily and conveniently adapt the detector to the detecting and sensing needs of the users.

In one embodiment, the radiation filter (6) includes one or more spatial filtering abilities, as illustrated in FIG. 5. The radiation filter (6) includes multiple parts (6a, 6b, 6c) having different transmissivities from each other. The sizes or the two-dimensional layout of the parts are not restricted by the illustration shown in FIG. 5. For example, the part (6a) can be transparent only to 5 um wavelength and the window (6b) can be transparent to only 10 um wavelength. Such apparatus enables multi-spectral sensing and imaging within one detector. The spatial filtering abilities can be achieved either through material selection, optical coating or a combination of both. In some implementation two or more different materials can be combined together to form the radiation filter (6). The filtering ability can be selected with regard to the designated application fields and/or to the sensing and detecting needs of the users.

In one embodiment, an optical filter (e.g., the linear variable filter (10)) is integrated into the lens or collimator (3), as illustrated in FIG. 6. For example, a linear variable neutral density filter is integrated on the backside of a collimating biconvex lens (3). The shape of the lens including a filter is not limited to a biconvex lens. It can include any kind of optical element for collimating and then filtering the incident light from the light source (2).

In some implementations the lens or collimator (3) can include more than one element. It is not limited to a collimating biconvex, planoconvex or Fresnel lens. In some implementations the light source (2), the lens or collimator (3), and the filter (10) can be one integrated element. Such element can generate a structured light pattern with a gradient light characteristic in one dimension.

In one embodiment, the detector (1) has an adjustable reflected light ray length. The amount of the captured light ray displacement (Y) by the micro mirror (4) depends on the light ray length L and the angle of incidence (q). Adjusting the reflected light ray length results in the adjustment of the radiation measuring sensitivity and measuring range.

One embodiment disclosed herein includes a calibration method. The method starts with reading and storing the initial position of each light spot on the imaging surface (5) in an initial state. Each light spot is initially reflected of the reflecting top surfaces of each micro mirror (4) in an initial, non-irradiated state. Then, the array of the micro mirrors (4) is illuminated with specific calibrated radiation intensity to cause the light spots to change their positions on the imaging surface (5). The new calibrated positions are read and stored. The initial positions can be set as a value for no incident radiation and the calibrated positions for the defined and calibrated value of incident radiation. Since the responding behavior of the light spot displacement is substantially linear relative to the radiation, a measured light spot position between the initial position and the calibrated position represents the corresponding fraction of calibrated incident irradiation. This method can be referred to as a one-point calibration of the electromagnetic radiation detector 1. This is one example of how the light spot displacement, which represents an incident radiation intensity value is converted into an electrical signal gain for signal processing. In some implementations a two-point or multi point calibration method can be applied for calibrating the detector (1).

The mechanism (50) to adjust the position of the imaging surface (5) relative to the mirror plane (19) along the initial reflected readout light ray lengths, in a manner that all reflected readout light ray lengths remain substantially identical in length at an initial state, is not limited to a specific embodiment. The mechanism can include rails with manual position fixation elements or it can include an automated drive, which can adjust the position automatically.

In some embodiments, the detector (1) includes not only a housing (99), a light source (2), a collimator (3) with an optical filter (10), an array of micro mirrors (4), a photodetector (31) or a screen (31a) with a camera (90), a radiation filter (6), and/or a signal processing unit (7), but also a communication module, a battery, an radiation imaging lens and additional sensor or multi-sensor module including a visual camera for capturing the scene monitored by the micro mirrors (4). In some embodiments, the detector (1) further includes a plural of radiation filtering zones (e.g., 6a, 6b, and 6c as illustrated in FIG. 5) having different transmission characteristics for the simultaneous detection in different wavelengths and bandwidths. Further the radiation filter/lens (6) can be fixed with, for example, a retaining ring. The fixation with a retaining ring is only exemplary and other methods for attaching and exchanging the radiation filter/lens (6) can be used.

In one embodiment, the positioning mechanism (50) is configured to adjust automatically along the direction of the initial reflected light ray (without the radiation (r)). The drives for adjusting the imaging surface (5) are schematically indicated as elements (50) in FIG. 6. The adjustable position of the photodetector 5 allows the end user to adjust the sensitivity versus measurement range for the needs of the user.

In FIG. 3A, the signal processing unit (7) is disposed inside the housing (99). The signal processing unit (7) processes the reflected light spot displacements and generates corresponding electrical signal gains. The signal can be further processed and for example displayed to the end used via an external display. A display and a user interface can be also part of the detector. Further, the signal processing unit (7) can be disposed outside the housing (99) in some embodiments. It can be located externally to the housing (99) and be connected to the photodetector (31) via a wired or wireless connection.

The signal processing unit (7) can be programmed for customized processing of designated applications. For example, for gas sensing applications, the signal processing unit (7) can be programmed in such manner, that an alarm is triggered when a certain wavelength (e.g. corresponding to detection via the filter (6a)) rises or falls below a certain value. For example, an IR light source can be directed onto the portion of the micro mirrors (4) covered by the filter (6a); and if its detected radiation intensity falls below a certain threshold, then the traceable gas is present in the line of sight. As an example, the filter (6a) can be highly transparent to only a bandwidth of about 4.6-4.9 um for carbon monoxide concentration detection. Such spectroscopy measurement method is just one example of the possible uses of the detector (1). The other two filters (6b and 6c) this example can be for example MWIR and LWIR transparent respectively.

In one example, the processed signal is transmitted through a communication port wirelessly to a portable device, where the end user can see the generated signals and has the ability to control or interact through a user interface with the detector. The signals can be transmitted and exchanged through any wired or wireless transmission method, using e.g. a USB, Bluetooth, Wi-Fi, etc. The end user's display and interface can include any device, for example a smartphone, tablet, laptop computer, etc.

In one embodiment, the detector (1) includes a multi-sensor module that includes an array of sensors that additionally detect different physical properties in the surroundings of the detector (1). For example the sensor multi-sensor module can include a visual imager to capture the detected radiation scenery in the visual band. Further it can include a temperature, humidity and air-pressure sensor. Further it can include a microphone or actuators such as a speaker. As a portable device it can include an acceleration sensor, a position sensor, GPS-module, etc. The sensor module is not limited in the amount or the method of example sensing and actuating devices discussed herein.

In one embodiment, the detector (1) further includes an energy generating unit such as a solar cell, wind turbine, etc. to power the operation of the detector (1). Further, it may include an energy-storing unit such as a battery and/or a user interface. It can also include a data storage unit where processed or raw data may be stored. For example, the detector (1) can include a small solar panel, an exchangeable and chargeable battery and an adapter for a memory card.

In one embodiment, the imaging lens of the radiation filter (6) focuses electromagnetic radiation onto the array of the micro mirrors (4). The imaging lens is demonstrated in this embodiment for schematic purposes only. In some implementations, the imaging lens can include more than one element to focus and image the electromagnetic radiation onto the array of micro mirrors (4). A lens configured for two- or multi-element radiation imaging, referred to as an objective or optical imaging system, can also be used.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A radiation sensing apparatus, comprising:
   at least one row of micro mirrors arranged along a first direction in a first plane, each respective micro mirror in the row of micro mirrors having a radiation absorbing surface and a light reflecting area positioned at an opposite side of the radiation absorbing surface, wherein the respective micro mirror is configured to rotate along a second direction in the first plane in response to radiation absorbed in the radiation absorbing surface;
   a light directing device configured to direct a respective light ray from a light source to the light reflecting area of the respective micro mirror, wherein:
      a first ray directed to a first micro mirror in the row of micro mirrors generates a first reflected ray; and
      a second ray directed to a second micro mirror in the row of micro mirrors generates a second reflected ray;
   an imaging surface facing the light reflecting area of the respective micro mirror to receive lights of different optical characteristics reflected from different micro mirrors in the row, wherein the different optical characteristics include different light intensity along the first direction, and wherein the first reflected ray has a first optical characteristic, the second reflected ray has a second optical characteristic different from the first optical characteristic;
   an image sensor to capture an image of the lights reflected from the row of micro mirrors and formed on the imaging surface; and
   a signal processing unit to correlate, based on the different optical characteristics, light spots captured in the image with respective micro mirrors in the row.

2. The radiation sensing apparatus of claim 1, wherein the light directing device produces and directs light rays having the different optical characteristics at light reflecting areas of the different micro mirrors in the row.

3. The radiation sensing apparatus of claim 1, wherein the light directing device includes a linear variable filter.

4. The radiation sensing apparatus of claim 3, wherein the light directing device further includes a collimating lens; and the linear variable filter is integrated with the collimating lens.

5. The radiation sensing apparatus of claim 1, wherein light reflecting areas of different micro mirrors of the row have different optical characteristics to produce the different optical characteristics of the lights reflected onto the imaging surface.

6. The radiation sensing apparatus of claim 5, wherein the different optical characteristics of the light reflecting areas include different shapes of the light reflecting areas.

7. The radiation sensing apparatus of claim 1, further comprising:
   a plurality of different radiation filters configured to provide differently filtered radiations on radiation absorbing surfaces of different micro mirrors in the row.

8. The radiation sensing apparatus of claim 1, further comprising:
   an imaging lens to filter radiation directed to radiation absorbing surfaces of different micro mirrors in the row.

9. The radiation sensing apparatus of claim 1, further comprising:
   a mechanism to adjust a distance between the imaging surface and the first plane.

10. The radiation sensing apparatus of claim 1, wherein the light directing device includes a diffraction grating or a beam splitter.

11. The radiation sensing apparatus of claim 10, wherein the light directing device includes a point light source.

12. The radiation sensing apparatus of claim 1, further comprising a partially transparent component having the imaging surface.

13. The radiation sensing apparatus of claim 1, wherein the light directing device is configured to direct light from an incoherent light source as light rays to light reflecting areas of the row of micro mirrors.

14. A radiation sensing apparatus, comprising:
    a plurality of rows of micro mirrors, each respective row in the plurality of rows being arranged along a first direction in a first plane, each respective micro mirror in the respective row having:
       a radiation absorbing surface; and
       a light reflecting area, wherein the respective micro mirror rotates along a second direction in the first plane in response to radiation absorbed in the radiation absorbing surface;
    a light source;
    an imaging surface, wherein:
       light from the light source is reflected by the light reflecting area of the respective micro mirror to generate a light spot on the imaging surface, and
       rotation of the respective micro mirror rotate along the second direction causes a displacement of the light spot in the first direction on the imaging surface;
    an image sensor that captures an image of light spots generated by light reflecting areas of the micro mirrors in the plurality of rows; and
    a signal processing unit that measures the displacement of the light spot by identifying a light spot captured in the image as being reflected by the light reflecting area of the respective micro mirror based on differences in optical characteristics of a set of light spots generated by the respective micro mirror and adjacent micro mirrors that are adjacent to the respective micro mirror in a row along the first direction in which the respective micro mirror is located;
    wherein the differences in the optical characteristics of the set of light spots include differences in light intensity of light spots in the set.

15. The radiation sensing apparatus of claim 14, further comprising:
    a linear variable filter coupled between the light source and the imaging surface to generate the differences in light intensity.

16. The radiation sensing apparatus of claim 14, wherein the differences in the optical characteristics of the set of light spots include differences in shapes of light spots in the set.

17. The radiation sensing apparatus of claim 14, wherein light reflecting areas of micro mirrors generating the light spots have different optical characteristics to produce the differences in the optical characteristics of the set of light spots.

18. A radiation sensing apparatus, comprising:
    at least one row of micro mirrors arranged along a first direction in a first plane, each respective micro mirror in the row of micro mirrors having a radiation absorbing surface and a light reflecting area positioned at an opposite side of the radiation absorbing surface, wherein the respective micro mirror is configured to rotate along a second direction in the first plane in response to radiation absorbed in the radiation absorbing surface;

a light directing device configured to direct a respective light ray from a light source to the light reflecting area of the respective micro mirror, wherein different rays projected onto different micro mirror in the row of micro mirrors generate different reflected rays;

an imaging surface facing the light reflecting area of the respective micro mirror to receive the different reflected rays of different optical characteristics, wherein the different optical characteristics include different light intensity along the first direction;

an image sensor to capture an image of the different reflected rays of the different optical characteristics projected onto the imaging surface; and a signal processing unit to correlate respective micro mirrors in the row with light spots captured in the image.

19. The radiation sensing apparatus of claim 18, wherein light reflecting areas of the different micro mirrors of the row have different optical characteristics to produce the different optical characteristics of the different reflected rays projected onto the imaging surface.

20. The radiation sensing apparatus of claim 19, wherein the different optical characteristics of the light reflecting areas include different shapes of the light reflecting areas.

* * * * *